June 4, 1929.  H. G. CORDLEY  1,715,353
SPIGOT
Filed July 1, 1926
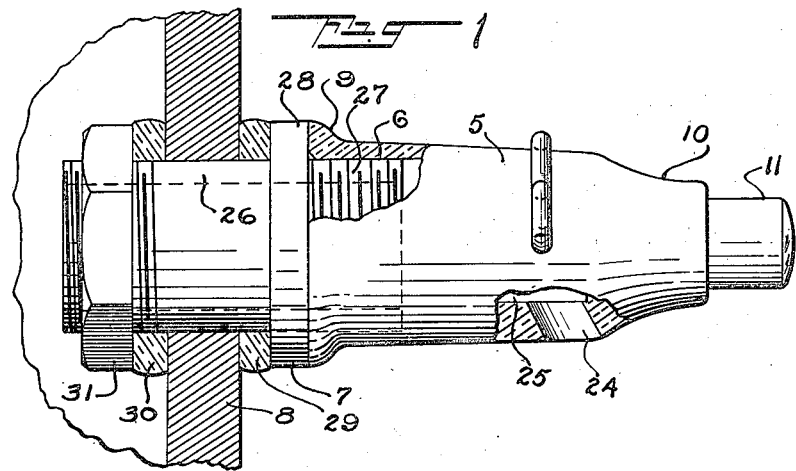
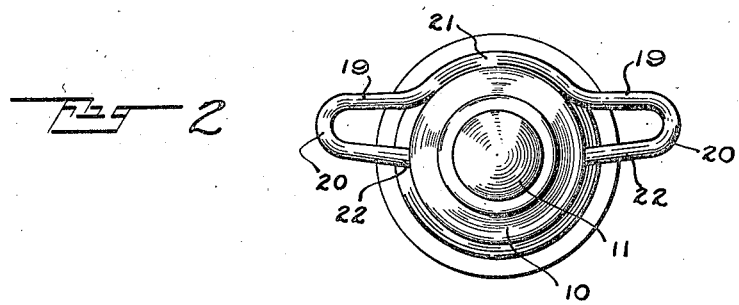
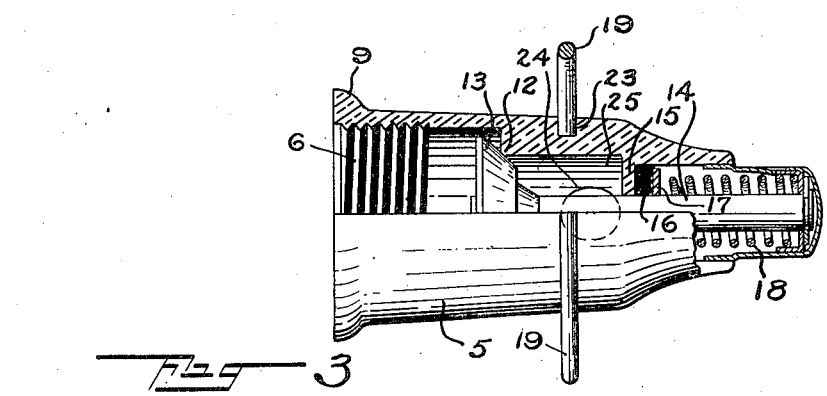
INVENTOR.
Henry G. Cordley
BY
Abel L. Brownrigg
ATTORNEYS.

Patented June 4, 1929.

1,715,353

UNITED STATES PATENT OFFICE.

HENRY G. CORDLEY, OF NEW YORK, N. Y.

SPIGOT.

Application filed July 1, 1926. Serial No. 119,821.

This invention relates generally to a faucet or spigot construction.

It is well known that the metallic faucets or spigots ordinarily used in connection with containers for fruit syrups and various beverages used at soda fountains are likely to be acted on by the acids present in the liquid contents of the containers. The result is that the flavor of these syrups or beverages supplied to the customers not infrequently is marred by an unpleasant taste suggestive of metal. In order to avoid the use of metal, the use of porcelain or other vitreous materials in the spigots has been suggested as a substitute for metal but such materials are unsatisfactory because of their brittle or breakable nature.

A general object of the present invention is to provide a faucet or spigot which will be free from the objections referred to and will be impervious to the action of acids or other agents present in fruit syrups or the like; which will present an attractive appearance; which can be manufactured at a relatively low cost; and which will not be subject to breakage in use.

The invention consists of a spigot formed of bakelite, fiber, or other similar material which has the advantage of being wholly impervious to the action of acids or other ingredients present in fruit juices; which has the further advantage of being unbreakable; and which is sanitary and has an attractive appearance.

A feature of the invention resides in the provision of a guard pull member formed separately and adapted to be attached to the body of the spigot through engagement with recesses formed for the purpose in the exterior surface of the side walls thereof. The attached pull member is preferably formed of highly finished metal and not only adds substantially to the attractive appearance of the device as a whole but also enables the molding of the spigot body members to be accomplished without the use of a split mold, thereby reducing the cost of the molding operation as well as producing a uniformly finished and smooth molded product.

Other features of the invention will be hereinafter referred to.

In the drawings, in which a preferred embodiment of the invention has been selected for illustration:—

Figure 1 is a view partly in side elevation and partly in vertical section of a spigot construction embodying the invention;

Figure 2 is a view in end elevation of the device shown in Figure 1;

Figure 3 is a view partly in plan and partly in horizontal section of the parts shown in Figure 1.

Referring to the drawings for a more detailed description of the invention, a spigot construction is shown which includes a body member 5 formed of bakelite, fiber, or similar material, which includes the characteristic of being impervious to the action of acids or other agents found in fruit syrups, flavoring extracts, and the like. The body member 5 is formed by a molding process and it will be seen that the generally tapered formation which is shown facilitates the withdrawal of the molded product from a mold along the longitudinal axis of the mold, thereby obviating the necessity for the use of molds of the split or divisible type.

The body portion 5 of the spigot is provided at one end with a threaded section 6 for engagement with the delivery nozzle 7 of a suitable container 8. A rim member 9 formed at the extreme end of the body portion 5 not only adds to the attractiveness of the spigot but provides a reinforcing structure for the end portion of the body member. The forward or extended end of the body member 5 is reduced in section as at 10, thereby adding to the attractiveness of the device and providing a seat for a valve operating member 11 of the push button type.

The body member 5 is provided internally with an annular shoulder 12 which forms a seat for a valve member 13, the valve member being connected through a stem 14 with the push button 11 already referred to. A partition member 15, formed in the body member 5 forwardly of the shoulder 12, provides a wall which acts to prevent the flow of liquid into the extended end 10 of the body member. Preferably a washer 16, formed of leather or similar material, is mounted against the forward face of the partition member 15. A washer 17 engages the forward face of the leather washer 16 and forms an abutment member for the end of a helical spring 18 which extends into the push button member 11 at its other end.

A feature of the invention resides in the provision of a reaction or pull member 19 which is engaged by the fingers of the operator while a thumb is used to exert pressure on the push button member 11 to force the valve 13 from its seat 12. The pull member 19 is preferably formed from a section of relatively stiff wire and it will be seen that the formation of the pull member is such that oppositely extending loop portions 20 are provided at each side of the body portion 5 of the spigot structure. The pull member is curved as at 21 in a mid portion to roughly conform to the curvature of the upper side of the spigot body member 5. The terminal portions of the section of wire which forms the member 19 are turned inward and directed toward each other as at 22 and are received in recesses 23 formed in the opposite side walls of the body member 5 for the purpose.

It will be seen that the provision of a pull member which is formed for attachment to the spigot structure after the body portion thereof is formed in a molding or other operation, provides for the molding of the spigot body portion in a unitary mold, as has already been pointed out. Not only does the use of a pull member of this type lessen the cost of production of the spigot as a whole but the use of a pull member formed of highly finished and polished metal adds considerably to the attractiveness of the device.

Preferably the recesses 23, formed in the body member 5 for the reception of the terminal portions of the pull member 19, are formed in a simple drilling or similar operation. The discharge port 24 for the spigot may be formed in a similar operation or it may be formed in the molding operation or in any other desired manner. It will be seen that the discharge port 24 leads downwardly and forwardly from the chamber 25 formed between the valve seat 12 and the wall 15 in the body portion 5 of the structure.

Not only do I contemplate the use of bakelite or the like from which to construct the body portion of the device, but I may make use also of similar material from which to form the valve and to coat the valve stem 14, thereby preventing contact of the liquid with metal surfaces likely to affect the taste of the liquid drawn from the container. The stem 14 may also be plated with silver or the like for the same purpose.

In attaching the spigot to the container 8 a connecting tubular section 26 formed of bakelite has a screw threaded section 27 for engagement with the threaded section 6 of the spigot. A flange 28 on the tubular section 26 is directly engaged by the rim 9 of the spigot. A washer 29 is held between the flange 28 and the side of the container 8. A second washer 30 engages the inner surface of the wall of the container 8 and is in turn engaged by a nut 31 engaging the inner end of the tubular section 26. The nut 31 is also formed of impervious material.

What I claim is:

1. In a spigot having a valve operating member of the push button type mounted in the extended end of the body portion, and a pull member formed of a section of rigid wire, said pull member being attached to the body portion and extending transversely thereof.

2. In a spigot having a valve operating member of the push button type mounted in the extended end of the body portion, the body portion being provided with recesses in the exterior surface of its opposite side walls, and a pull member formed of a section of relatively stiff wire, said pull member having its terminal portions seated in said recesses and extending in opposite directions from the opposite sides of said body portion.

3. In a spigot having a body portion with an extended end and a valve operating member of the push button type mounted in the extended end of the body portion, the body portion being provided with recesses in the exterior surface of its opposite side walls, and a pull member formed of a section of relatively stiff wire curved in its mid portion to engage the upper surface of the spigot body portion, said pull member having its laterally extended ends inturned to seat in said recesses.

HENRY G. CORDLEY.